INVENTORS
Harold A. McMaster,
& Norman C. Nitschke

Barnard, McGlynn & Reising
ATTORNEYS

United States Patent Office 3,399,042
Patented Aug. 27, 1968

3,399,042
METHOD AND APPARATUS FOR CONVEYING AND HEAT TREATING GLASS SHEETS OVER A GAS SUPPORT BED
Harold A. McMaster, Woodville, and Norman C. Nitschke, Perrysburg, Ohio, assignors to Permaglass, Inc., Woodville, Ohio, a corporation of Ohio
Original application Nov. 29, 1963, Ser. No. 326,713, now Patent No. 3,332,759, dated July 25, 1967. Divided and this application Sept. 15, 1966, Ser. No. 579,629
11 Claims. (Cl. 65—25)

ABSTRACT OF THE DISCLOSURE

Method and apparatus for treating sheets of glass including an elongated bed with passages therein and means to cause gas to be emitted from the passages to support the sheets of glass above the bed. A loop conveyor disposed adjacent one longitudinal edge of the bed with supports pivotally attached to the loop conveyor and extending transversely over the edge of the bed for contacting the edges of glass sheets for moving the glass sheets therealong, the supports also being adapted to float on the gas above the bed.

---

This application is a division of application Ser. No. 326,713, filed Nov. 29, 1963, now Patent 3,332,759 in the names of Harold A. McMaster and Norman C. Nitschke and assigned to the assignee of the instant invention.

It is a principal object of the present invention to provide an improved method and apparatus for manufacturing sheets of glass or the like efficiently and at relatively low cost. More specifically, it is an object of the invention to provide a glass manufacturing apparatus of the type described whereby tempered curved glass sheets of exceptionally high quality can be manufactured on a continuous high production basis at relatively low cost with very low scrap or breakage losses. These along with other objects, features and advantages of the invention will appear more clearly from the following detailed description of a preferred embodiment thereof made with reference to the drawings in which:

Figure 1:
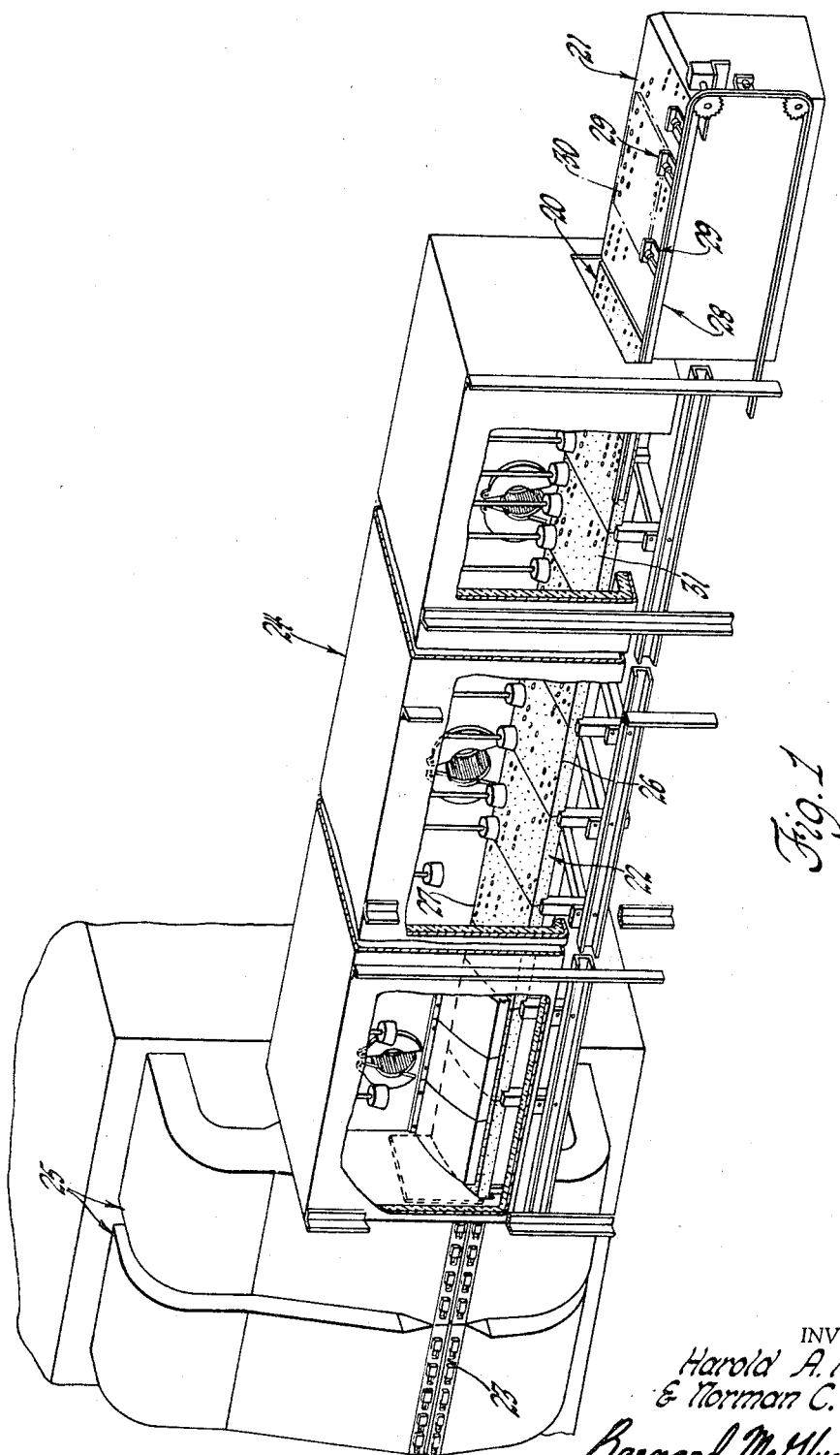
FIGURE 1 is an isometric view, with parts broken away and partially schematic, of the preferred apparatus and illustrates the bed configuration into and through the heating furnace wherein the glass sheets are curved, and into and through the blasthead wherein the curved glass sheets are tempered.
Figure 2:
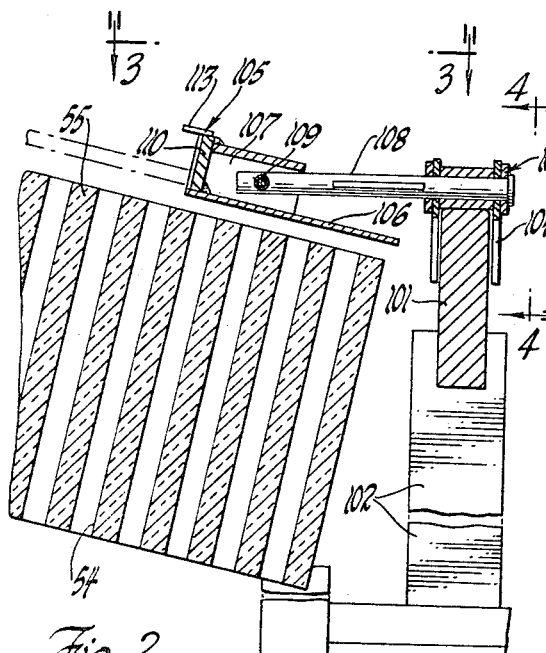
FIGURE 2 is a cross sectional view of a portion of the conveyor means extending along one side of the furnace of FIGURE 1 illustrating the position of the various parts.
Figure 3:
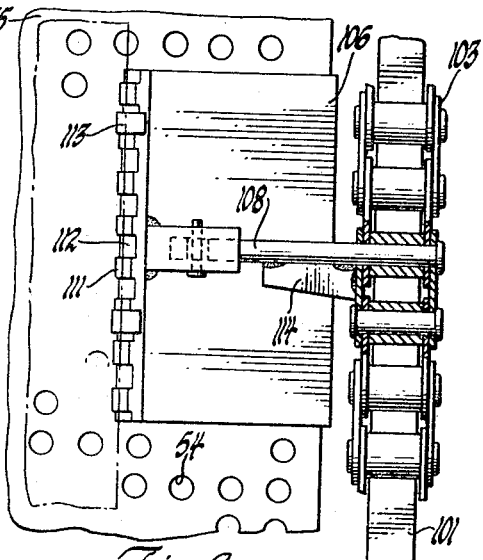
FIGURE 3 is a plan view of the conveyor system and conveyor support foot taken substantially along the line 3—3 of FIGURE 2 and looking in the direction of the arrows.
Figure 4:
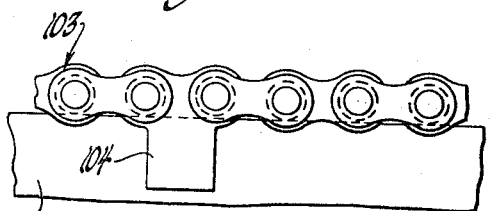
FIGURE 4 is a partial elevational view of a portion of the conveyor chain of FIGURES 2 and 3.

Referring more particularly to FIGURE 1, the apparatus shown comprises an elongate perforated bed, illustrated generally by the numeral 20 which, in the actual embodiment herein shown, is about 180 feet long and is composed of three main sections. These sections include a loading section 21, a heating and bending section 22, and a tempering section 23. The heating and bending section 22 is within and constitutes the floor of an elongate furnace structure, illustrated generally by the numeral 24, and the tempering section 23 extends through a cooling blast head, illustrated generally by the numeral 25. The bed is flat throughout section 21 and most of section 22; and approximately two-thirds of the way through section 22 gradually becomes curved in a direction transverse to the longitudinal axis of the bed. Bed section 23 within the blasthead 25 and the portion of section 22 toward the end of the furnace adjacent the blasthead have a uniform transverse curvature substantially the same as that desired of the glass sheets to be manufactured. The plane of the bed is tilted about the longitudinal axis thereof at a slight angle to the horizontal, preferably from about 3° to 12°, and hence the left longitudinal edge of the bed, as shown at 26, is lower than the right edge 27. A chain conveyor system, illustrated generally by the numeral 28, carrying spaced pairs of glass sheet support pads 29, serves to move the glass sheets over the bed 20 from the loading section 21 through the furnace 24 and through the blasthead 25. Gas emitted from perforations in the bed 20 provides a film or cushion of gas on the bed for flotation of the glass sheets thereover in a manner to be described in detail hereinafter. In essence, then, and without attention at this time to important features and details, the apparatus operates as follows: The glass sheets 30 to be curved and tempered are placed onto the bed at loading section 21 with the bottom edge of each sheet resting on a pair of pads 29 secured to the conveyor chain 28. The glass sheets are conveyed by the chain and float over the bed out of contact therewith by reason of the gas emitted from the perforations in the bed. The floating glass sheets are thus guided through the furnace 24 where they are heated to deformation temperature by the hot gases emitted from the bed perforations and as they reach the curved porion of section 22, the sheets sag under gravity to conform to the curvature thereof, all the while supported on gas out of contact with the bed. Hence, when the sheets reach the end of the furnace, they are shaped with the full curvature desired. Transportation of the floating heated curved glass sheets then continues through the blasthead 25 where they are tempered by the cooling air projected from the bed perforations in the blasthead.

The bed comprises a plurality of blocks 31 which are aligned and in abutting relationship. The bed has a flat upper surface over most of its length in order to provide sufficient time for the sheets to be heated to deformation temperature as they are moved along the bed. In a zone toward the end of the furnace, the bed surface contour changes gradually from flat to curved. At the end of the furnace and into the blasthead, the contour of the bed 20 is of a constant degree of transverse curvature to provide the curvature desired in the glass sheets.

Conveyor system

As has been previously pointed out, the support bed 20, extending through the furnace 24 and through the blasthead 25, is disposed therewith at a slight angle, 12° in the embodiment shown, relative to the horizontal plane of the furnace. With the glass sheet 30 floating on a blanket of gases above the support bed 20 and the blanket of gases being of substantially constant thickness, it is obvious that the glass sheet will have a component of weight force directed along the plane of the surface of the support bed 20. Due to this angularity and this component of force, it is possible to provide a conveyor system which will transport the glass sheets along the length of the support bed with very light contact with the glass sheet 30. It will be further apparent that with the glass sheet 30 floating on the blanket of hot gases over the support bed 20, that very little force will be necessary to transport or convey the glass sheet along the bed, and thus very light contact in the direction of travel is all that is necessary.

Referring now to FIGURES 1 through 8, the conveyor system for the glass sheets includes a guide rail 101 which is formed in aligned sections and extends alongside the lower edge of the bed for the entire length of the loading station, the furnace, and blasthead. The rail 101 may be suitably supported by posts 102, supported on the furnace superstructure in a suitable manner. Riding on guide rail 101 is a conveyor chain, indicated generally by the numeral 103, of typical link and bearing rod construction having spaced members 104 depending downwardly therefrom at spaced points therealong and straddling the rail 101. An electric motor driven sprocket serves as means for driving the chain. The particular features of the chain and its drive means whereby the chain is maintained taut and is driven at a smooth uniform speed through the furnace and blasthead are described in detail and claimed in United States Patent application Ser. No. 478,521 filed July 15, 1965, now Patent No. 3,282,447 in the name of Harold A. McMaster and assigned to the assignee of the present invention.

Extending inwardly from the chain 103 toward the support bed 20, and at properly spaced intervals therealong, are support members or feet, indicated generally by the numeral 105. Each support foot 105 includes a lower plate member 106 which is supported on the support bed 20 by flotation in the same manner as the glass sheets 30. Thus, the support members 105 are at least partially supported by gas out of contact with the upper surface of the bed. The instant invention, therefore, set forth a novel method including the steps of contacting at least one edge of the sheet of glass with the support member 105 and supporting at least a portion of the support member 105 on gas and thereafter moving the support member 105 to impart movement to the glass sheet. The plate members are provided with upstanding ribs 107 to which are secured suitable rods 108 extending and secured to the conveyor chain 103. The connection 109 between the rods 108 and the ribs 107 is rather loose to allow some pivotal movement for purposes to be hereinafter described. The conveyor means thus includes all of the components necessary to the conveyor assembly such as the supports 102, the rail 101, the power input to move the chain 103, etc. However, the conveyor means does include a drive means which, as illustrated, includes the rod 108 and/or the chain 103. Thus, the pins 109 are means connecting the supports 105 to the drive means in a manner to permit relative movement of the support 105 with respect to the drive means in a direction generally transverse the longitudinal axis of the bed and, more specifically, pivotally connects the support members 105 to the drive means to allow pivotal movement therebetween in a plane generally transverse the longitudinal axis of the bed.

Extending upwardly from the inner edge of lower plate 106 is substantially vertical plate member 110 provided with a series of vertical lands and grooves 111 and 112, respectively. It is desirable that the face of plate member 110 be as perpendicular as possible to the plane of the glass sheet 30 disposed thereagainst, and the glass sheet 30 with its component of weight force in the direction of its surface, lightly engages the lands 111 on the upstanding plates 110. The slight frictional engagement of the plate members 110 with the glass sheets 30 is sufficient to convey the glass sheets through the furnace 24 and blasthead 25 along with the chain 103. Extending outwardly from the top edge of the plate members 110 may be spaced tabs 113 which serve as a stop means to prevent extreme upward movement of the glass sheets 30. Normally, however, the glass sheets do not engage the tabs 113 but are engaged with the upstanding plates 110 toward the lower edge thereof.

Extending outwardly from the rod members 108 are plates 114 which are secured to the rod members 108 and to the chain 103 to properly direct the rod members 108 toward the interior of the furnace 24. Such plates 114 maintain the precise angularity of the rod members relative to the chain 102 that is desirable in the installation. The plate members 114 also serve to structurally maintain the rod members on the chain 103.

Figure 5:
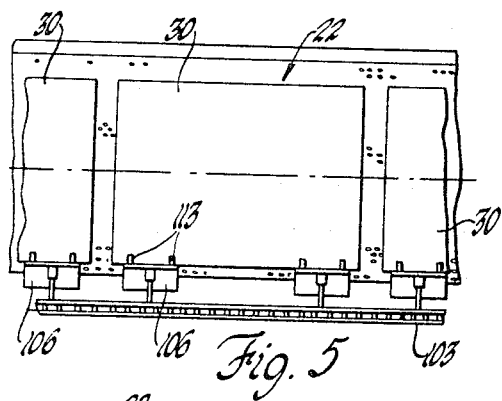
FIGURE 5 is a schematic view of a portion of the bed assembly and conveyor means showing the position of the glass sheets for transportation across the bed.

As indicated in FIGURE 5, the support feet 105 engage the glass sheets 30, one at the forward end of the sheet and the other at the rearward end of the sheet. If more support is necessary for the glass sheets 30, or if the glass sheets 30 are of extreme length, it may be desirable to provide additional support feet 104, located as necessary for support of the glass.

Figure 6:
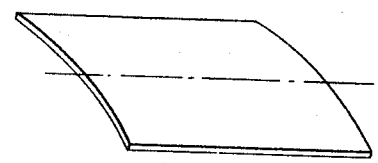
FIGURE 6 is a perspective view of a glass sheet such as might be treated in the furnace illustrated in FIGURE 1 and wherein the axis of the curvature is parallel to the edge of the sheet.
Figure 7:
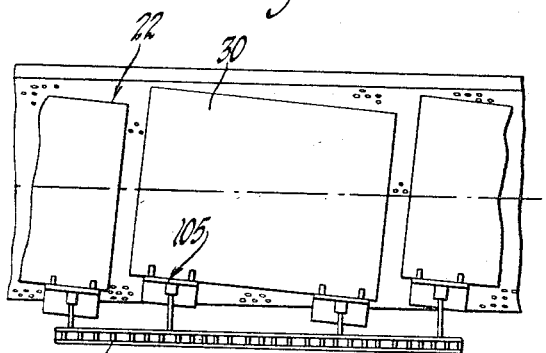
FIGURE 7 is a schematic view of a portion of the bed assembly showing glass sheets in another portion for transportation across the bed and through the furnace of FIGURE 1.
Figure 8:
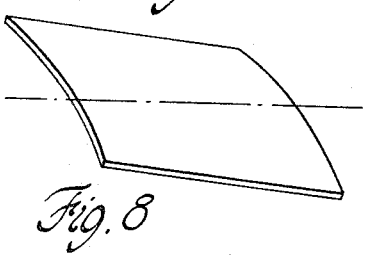
FIGURE 8 is a perspective view of a glass sheet such as might be treated in the furnace of FIGURE 1 and with the axis of curvature angularly disposed relative to the edge of the glass sheet.

As illustrated in FIGURES 5 and 6, the glass sheets supported by the feet 105 come out of the furnace 24 and blasthead 25 with a curvature about the longitudinal axis of the glass sheets 30. This is accomplished by spacing the front support foot the same distance from the chain 103 as the rear support foot, thus having the edge of the glass sheet 30 parallel to its longitudinal center line. However, if it is desired to form glass sheets with a cylindrical curvature about an axis at an angle to the edge of the glass, this can be conveniently accomplished with the apparatus of this invention, as is illustrated in FIGURES 7 and 8. As shown in these figures, the glass sheet has a curvature about a center line angularly disposed relative to the central axis of the glass sheet. This is accomplished by having the distance of the front support foot 105 from the chain 103 greater than is the distance of the rear support foot, as illustrated in FIGURE 7. Under such conditions, the glass sheet 30 will be forced to float along the support bed 20 obliquely of the longitudinal axis of the support bed, and thus the desired curvature and axis of curvature are obtained. Where considerable angularity between the axis of curvature and the longitudinal axis of the sheet is desired, it may be advantageous to provide an extension on the rear foot to engage the rear edge of the glass and thereby insure against the glass sheet slipping from the support feet within the furnace. It will be apparent that any axis of curvature may be provided by the combination of support foot location and the surface contour of the support bed 20. The instant invention, therefore, discloses a method of curving a sheet of glass 30 as illustrated in FIGURE 7 about an axis (i.e., the centerline of the bed illustrated in FIGURE 7) which is in intersecting relation to an edge of the sheet, that edge being the edge next adjacent the longitudinal edge of the bed which in turn is adjacent the chain 103. The method includes the step of placing the sheet of glass 30 on gas above the elongated bed which has a transversely curved portion in a manner to place the edge in an oriented position adjacent the longitudinally extending edge of the bed adjacent the conveyor and with the edge at an angle in intersecting relationship to the longitudinally extending edge of the bed, as illustrated in FIGURE 7. The sheet is then heated to deformation temperature and moved along the bed while the edge is maintained in the oriented position as illustrated in FIGURE 7. The novel method may also be expressed as including the step of contacting an edge of the sheet and conveying the sheet along the bed in a manner that the edge which is contacted is on a line in intersecting relation to the edge of the bed.

The conveyor can be of constant speed or it can be of variable speed so that the glass sheets can be moved relatively rapidly into the blasthead and then slowed down within the blasthead. Of course, where a single variable speed chain is used this will mean that the sheets within the furnace also move at varying speeds. In one method of operation, the glass sheets are sent through the apparatus in spaced pairs, the conveyor speed changes being sequenced such that as a pair of sheets is being moved into the blasthead at slightly increased speed, spaced pairs of sheets within the furnace are fore and aft of but not directly over the curvature transition zone. Of course, other arrangements can be used if desired. For example, a separate higher speed conveyor chain can be used for the blasthead, such chain being cooperative with that through the furnace so that the glass sheets are transferred from the one to the other at the end of the furnace. Where this system is used it is desirable that means be provided to preheat the support feet on the blasthead chain before they come in contact with the hot glass lest chill cracks develop in the sheets when contacted by such support feet.

To inhibit the flow of cool air into the furnace from the blasthead and hot gas into the blasthead from the furnace, a reciprocable door can be provided between the furnace and blasthead as indicated in broken outline at 119 in FIGURE 1. Such door can be raised to allow passage of one or more glass sheets into the blasthead, and then lowered again by suitable means cooperative with the chain or the chain drive means.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. Apparatus for treating sheets of glass comprising an elongated bed having passages therein, conveyor means for moving the sheets of glass over said bed, and means for causing gas to be emitted from said passages to support the glass sheet above the bed, said conveyor means including drive means movable longitudinally of said bed and spaced glass sheet supports extending transversely over the longitudinally extending edge of said bed to contact the edges of said sheets and impart movement thereto longitudinally along the bed, and means connecting said supports to said drive means for permitting free movement of said supports relative to said drive means in a direction generally transverse to the longitudinal axis of said bed.

2. An apparatus as set forth in claim 1 wherein said means connecting said supports and said drive means comprises a pivot means to allow pivotal movement of said supports relative to said drive means in a plane generally transverse to the longitudinal axis of the bed.

3. Apparatus as set forth in claim 1 wherein said supports are arranged in spaced pairs which extend over a longitudinally extending edge of the bed, each pair for supporting a separate sheet of glass, and wherein one support of each pair extends further toward the center of the bed than the other support of said pair whereby a glass sheet conveyed by said pair of supports is positioned with the edge thereof which is adjacent said edge of the bed at an angle to the longitudinal axis of the bed.

4. The apparatus set forth in claim 1 wherein each of said supports includes a plate member overlying some of the passages in said bed and a second member angularly disposed to said plate member for contacting the edge of the glass sheet on said support.

5. The apparatus set forth in claim 4 wherein said second member is provided with spaced raised portions for contacting the edge of the glass sheet.

6. The apparatus set forth in claim 1 wherein said drive means comprises a member extending in an endless loop.

7. The apparatus set forth in claim 1 wherein said supports are provided with means for preventing the glass sheets in contact therewith from being floated off of said supports by the gas.

8. Apparatus for conveying a sheet comprising an elongated bed having passages therein, conveyor means for moving the sheet over said bed, and means for causing gas to be emitted from said passages to support the glass sheet above said bed, said conveyor means including a member extending transversely over the longitudinally extending edge of said bed to contact the edges of said sheet and impart movement thereto longitudinally along the bed, and means connecting said members to said conveyor for permitting free movement of said members relative to said conveyor in a direction transverse to the longitudinal axis of said bed, said member being at least partially supported by said gas over said bed.

9. A method of curving a sheet of glass about an axis which is in intersecting relation to an edge of said sheet comprising: supporting said sheet on gas above an elongated bed which has a transversely curved portion and orienting said edge in a position adjacent a longitudinally extending edge of said bed and at an acute angle in intersecting relationship thereto, heating said sheet to deformation temperature, and moving it while so heated along said curved portion while said edge of said sheet is held in said oriented position whereby said sheet deforms and is curved about an axis which is in intersecting relation to said edge of said sheet, and cooling said sheet.

10. A method of curving a sheet of glass comprising: supporting said sheet on gas above an elongated bed having a longitudinally extending portion curved about an axis parallel to an edge of said bed, conveying said sheet along said bed by contacting an edge of said sheet and orienting said edge of said sheet on a line intersecting relation to said edge of said bed, and heating said sheet to deformation temperature as it is conveyed along said bed whereby said sheet conforms to the curvature of said bed and is curved about an axis which is in intersecting relation to said edge of said sheet, and cooling said sheet.

11. Apparatus for conveying a sheet of glass comprising: a support bed, means supplying gas over said bed for supporting the sheet over said bed, conveyor means disposed adjacent said bed and including a sheet support means extending over said bed to contact an edge of the sheet and to move the sheet along the bed, said support means having a surface with sufficient area disposed over said bed to permit said support means to be supported at least in part by said gas.

References Cited
UNITED STATES PATENTS 3,223,501 12/1965 Fredley et al. _____ 65—182
3,253,756 5/1966 Haley et al. _____ 214—1

DONALL H. SYLVESTER, *Primary Examiner.*

A. D. KELLOGG, *Assistant Examiner.*